United States Patent
Lee

(10) Patent No.: US 6,789,510 B1
(45) Date of Patent: Sep. 14, 2004

(54) ANIMAL RESTRAINING APPARATUS AND ANIMAL EXPERIMENT FOR USING THE SAME

(76) Inventor: Ru-Ping Lee, No. 701, Sec. 3, Chung Yan Road, Hualien (TW)

( * ) Notice: Subject to any disclaimer, the term of this patent is extended or adjusted under 35 U.S.C. 154(b) by 0 days.

(21) Appl. No.: 10/448,368

(22) Filed: May 30, 2003

(51) Int. Cl.$^7$ .............................................. A01K 15/04
(52) U.S. Cl. ........................ 119/811; 119/809; 119/752; 119/756
(58) Field of Search ................................ 119/724, 752, 119/755, 756, 809, 811, 814, 818, 856

(56) References Cited

U.S. PATENT DOCUMENTS

| | | | | |
|---|---|---|---|---|
| 1,055,953 A | * | 3/1913 | Tanabe ........................ | 119/755 |
| 1,388,258 A | * | 8/1921 | Hasty .......................... | 119/724 |
| 1,483,377 A | * | 2/1924 | Ragsdale et al. ........... | 119/752 |
| 3,094,101 A | * | 6/1963 | Porter ......................... | 119/752 |
| 3,103,204 A | * | 9/1963 | Greene ....................... | 119/751 |
| 3,286,693 A | * | 11/1966 | Clarke, Jr. et al. .......... | 119/712 |
| 3,428,030 A | * | 2/1969 | Updegraff .................... | 119/752 |
| 3,442,255 A | * | 5/1969 | Berkowitz .................. | 119/753 |
| 3,973,522 A | * | 8/1976 | Rosow ........................ | 119/756 |
| 4,228,765 A | * | 10/1980 | Berlin ........................ | 119/752 |
| 4,709,660 A | * | 12/1987 | Hrushesky .................. | 119/751 |
| 4,995,335 A | * | 2/1991 | Wright ........................ | 119/738 |

* cited by examiner

Primary Examiner—Charles T. Jordan
Assistant Examiner—T. Nguyen
(74) Attorney, Agent, or Firm—Birch, Stewart, Kolasch & Birch, LLP

(57) ABSTRACT

An animal restraining apparatus and animal restraining procedure for using the same are provided. The experiment begins by preparing a live experiment animal, such as a mouse or rat coupled to a femoral vein/artery catheter via surgery. The experiment animal in a conscious state is then placed in a restraining apparatus. The restraining apparatus comprises a plurality of partitioning boards to partition the restraining space, such that the animal is restrained in the restraining space to prevent interference and infection from other animal, a supporting structure to carry the experiment animal, a rack for food and water, a signal receiver base, and a tail-fixing component fitted below or above the supporting structure. On the supporting structure, an opening is formed near the fixing component, with a guiding component formed outside the opening, such that the tail of the experiment animal can pass through the opening and follow the curvature of the guiding component until being restrained on the tail-fixing component. The curvature of the guiding component provides the least harmful and most natural curve for the tail of the rat or experiment animal. And by restraining the tail, the animal can be kept calm without agitation, while the animal is free to access food and water according to its physiological needs. Also, movement of the animal is kept to a minimum to prevent accidental catheter slippage.

11 Claims, 9 Drawing Sheets

ANIMAL RESTRAINING APPARATUS AND ANIMAL EXPERIMENT FOR USING THE SAME

FIELD OF THE INVENTION

The present invention relates to a restraining apparatus applicable to animal experiments, and more particularly, to an animal restraining apparatus and animal restraining procedure for using the same, such that the animal can be monitored continuously in a conscious state for more than seventy two hours without giving any anesthesia, tranquilizer, or muscle relaxation agent, and, except for restraining the tail, the body of animal is not bound or held in any way, so that the animal can freely access food and water based on its physiological needs.

BACKGROUND OF THE INVENTION

The purpose for performing animal experiments is to observe physiological and pharmacological responses induced by drug administration (intravenously, subcutaneous, peritoneal, and muscular) or external stimulation (electric shock or pathogen) in the test animals, so as to estimate possible reaction that may occur to the human body under the same exposure. This further serves as a basic model for clinical experiments. Typically, animal experiments conducted to estimate physiological and pharmacological states are generally divided into two model types, the conscious model and the anesthetic model. In the conscious model, behavior and reaction are observed after a drug is administered to the animal via feeding, subcutaneous injection, peritoneal injection, and tail intravenous injection, or when the animal is stimulated by epidermal chip implant or electric shock and heat or cold. The benefit of this model is that the animal is in the conscious state when the experiment is carried out. Therefore, the physiological changes of the animal are purely the result of the experimental drug after drug administration or external stimulation, and the physiological parameters yielded reflect the true situation in vivo.

However, in the conscious model, a conventional animal experiment usually adopts a more invasive arterial catheter method that involves catheterization at a common carotid artery in the front neck of the experiment animal. Then, the catheter passes through the cortical layer and comes out from the back of the neck. The method also requires continuous infusion of an anticoagulant to avoid blood clotting in the catheter. Also, a large wound is produced when the experiment is conducted by the invasive arterial catheter method. For this reason, the experiment has to be suspended until the wound is healed. So, by this method, breeding time and cost are both increased, and the animal may become infected and die more easily. Moreover, the pain experienced during the wound healing also disturbs emotional state of the animal, further affecting accuracy of the experimental data.

Also, when the experiment is to measure the physiological and pharmacological reactions in the animal at a particular time point (such as 2 hours after drug administration), the conscious model often involves sampling the sacrificed animal somewhat before that time point due to the time taken for surgical catheterization. Consequently variable time errors may be produced due to inconsistent surgical skills, and physiological changes in the experiment animal during the surgical procedure may introduce further errors. Moreover, the same set of the experiments is often conducted continuously over several time points so that the experimental result is statistically significant. Therefore, a large number of animals are often sacrificed to complete each experiment, reducing the benefit gained from each sacrifice.

Accordingly, some researchers have proposed surgical methods and other alternatives. For example, a small hole is drilled through the skull into the brain of the experiment animal to insert a probe, such that the other end of the probe is coupled to a monitoring system. Other less invasive methods may also be adopted to improve the foregoing problems such as hooking up the animal with a miniature transmitter back rack. So, with the probe with built in signal transmitter implanted in the brain and messages transmitted from the radio, animal behavior is monitored and the influence of the experimental factor is observed. However, the brain surgery conducted on the live animal lengthens the overall time of the experimental procedure and increases the risk of surgical infection. And, in most of the research related to biochemistry, pharmacology or hemodynamics, many sets of experiments often need to be conducted under the same conditions according to the experimental design. Yet, it is not possible to conduct experiments on many sets of animals without limit at the same time due to the complicated process of brain surgery and high cost of the probe within the built in micro signal transmitter. For example, if a hemodynamics experiment is to be carried out, such as a blood pressure related experiment, one single experiment typically requires at least 24 sets of animals in order to provide statistically meaningful/significant results. Also, each animal is administered with the test drug and monitored one by one, different sets of animals have varying exposure duration. So, it is impossible to compare the data since the data yielded is not uniformly obtained.

Further, if the experiment animal is monitored by carrying the radio back rack, a experiment animal with great learning ability will gradually reject the stressful operation and bite or break free from the back rack, particularly as the experiment is repeated, making conducting the experiment more difficult. The restraining back rack carried by the experiment animal also leads to agitation and irritation of the animal, interfering with physiological test results. In addition, reception and transmission of radio signals may be easily blocked or interfered with by external environmental influences.

In another experimental approach, a photoelectric volume oscillometric method was developed in the medical field to measure the tail pressure of the experiment animal, so that less harm is done to the animal body while still fulfilling the requirements for a hemodynamic experiment. The photoelectric volume oscillometric method is a non-invasive method for measuring tail cuff pressure (TCP). As illustrated in FIG. 9, the experiment animal 1" (such as rat) is confined in incubator 6" with its tail fitted to the cuff 7" for execution of the inflate/deflate cycle. In the inflation stage, the cuff 7" records the oscillating wave of the vascular wall produced by blood flow pulsations. And, through the transformation of the oscillating wave, the heart rate (HR) and arterial pressure (AP) of the live animal are ascertained, thus monitoring the basic physiological state of the animal.

But as both the duration and number of times the experiment is repeated increase, a experiment animal with great learning ability begins to reject, resist, or even struggle with the idea of confinement in the incubator. As such, the test result may contain errors, such as exaggerated AP and unstable HR induced by the emotional stress. Thus, the result does not truly reflect the effect of the experimental factor on the animal body.

Therefore, it has become an urgent need in the biomedical field to develop an animal restraining apparatus and procedure for using the same, so as to minimize the harm done to the animal and to reduce costs while making operation much easier. Also, the apparatus should be designed in such a way as to allow the number of animal sets to be expanded as much as possible to fulfill the requirements of the hemodynamic experiment.

SUMMARY OF THE INVENTION

An objective of the present invention is to provide an animal restraining apparatus and restraining procedure for using the same, so that the physiological reaction of the live animal in the conscious state can be monitored continuously for more than 72 hours in the experimental condition.

Another objective of the present invention is to provide an animal restraining apparatus and restraining procedure for using the same, which allows increasing the number of the experimental sets without limit in order to satisfy the needs in the hemodynamic experiment, and to carry out all sets of the experiments in different conditions at the same time, yielding a larger sample number.

Another objective of the present invention is to provide an animal restraining apparatus and restraining procedure for using the same such that the apparatus and experiment may be operated more easily with lower costs to restrain the tail of the animal, while the animal is free to access food and move about in order to lessen the emotional stress of the animal.

Another objective of the present invention is to provide an animal restraining apparatus and restraining procedure for using the same, such that no invasive harm is done to the experiment animal, while avoiding agitation of the animal. And, as interference to the experiment caused by the emotional stress of the animal is minimized, the effects of the test drug are truly reflected in the monitoring result.

Another objective of the present invention is to provide the animal restraining apparatus and restraining procedure for using the same, which requires no administration of anesthetic or other drugs which could interfere with the experimental data, so that the monitoring result of the instrument is closer to the true physiological state in vivo.

Lastly, another objective of the present invention is to provide a animal restraining apparatus and restraining procedure for using the same, such that the drug is administered timely and quantitatively via the vein catheter, and the blood pressure and heart rate are continuously measured via the artery catheter, so as to sample the animal blood at any time point according to the experiment design. Thus, while conducting the experiment, neither blood sampling nor drug administration would cause discomfort to the animal.

As embodied and broadly described herein, the invention provides an animal restraining apparatus and restraining procedure for using the same applicable to research related to hemodynamic, pharmacology, or physiology testing, wherein the experiment animal is monitored in the conscious state without external interference. The restraining procedure using the animal restraining apparatus includes the following steps.

First, a live experiment animal (such as rat) is prepared. A catheter is inserted at the femoral artery and/or femoral vein of the live experiment animal, such that one end of the catheter makes contact with the body fluid of the experiment animal and the other end of the catheter is coupled to an external monitoring device.

Then, the live animal is restrained by a restraining apparatus, wherein the apparatus contains a food supply component to provide the experiment animal with food and water ad libitum, a plurality of partitioning boards to confine the animal in the restraining space, a supporting board to carry the experiment animal and the partitioning boards, and a fixing component fitted below the supporting board to restrain the experiment animal. On the partitioning board, an opening is formed near the fixing component, with a guiding component formed on the supporting board outside the opening. And, at least one hole is formed outside the guiding component on the supporting board. Accordingly, after the experiment animal is restrained in the restraining apparatus, the tail of the animal can pass through the opening in an partitioning board, the guiding component, and the hole of the supporting board, in order to allow contact with the fixing component. Then, the tail of the live experiment animal is fixed (by adhesive tape binding or other binding methods) on the fixing component, so as to restrain the animal from moving forwards, preventing accidental slippage of the catheter.

Besides fixing the tail with the adhesive tape, a heavy object may be hung from the tail of the experiment animal according to another embodiment of the animal experiment, to immobilize the lower body of the animal, preventing catheter slippage due to excessive movement of the animal during the experimental procedure.

According to the restraining apparatus of the present invention, the tail of the experiment animal is fixed below or above the cage to allow the most natural body posture of the experiment animal. As the tail-fixing step does not cause any pain or discomfort to the experiment animal, the agitation level of the experiment animal is reduced, and rejecting or resisting behavior typically associated with conventional apparatus is overcome. So, the above-mentioned animal experiment is not only beneficial to the operation of the experiment, but also keeps the experiment animal emotionally stable in the conscious state during the experiment, avoiding variation of the in vivo bioassay values, such as, unstable heart rate and increased tail cuff pressure, caused by excessive struggling or increased emotional stress. The drug is also administered timely and quantitatively via the vein catheter, while the blood pressure and heart rate are continuously measured via the artery catheter, so as to sample the animal blood at any time point according to the experimental design. As the level of interference caused by artificial factors is minimized, the experiment result is increasingly determined by the experimental factors, such that a more accurate experimental estimation value is yielded.

Also, since the restraining apparatus can be operated easily and has very low equipment cost, the number of the experiment sets can be expanded without limit as long as space permits. Many sets of animals can be experimented on under the same control conditions to provide a larger sample number. And, the drug inconsistency problem caused by administering the drugs to the animals one by one is eliminated.

With the restraining apparatus of the present invention, the experimenter only needs to open a small wound at the femoral artery or vein of the animal for catheterization. Since the wound recovers quickly with a low chance of infection, the experiment animal hardly experiences any pain. Furthermore, in comparison to traditional conscious state animal experiments, the experimental procedure of the invention can be combined with animal breeding. Moreover, the invention allows continuous monitoring for more than 72 hours (even more than 120 hours) in the conscious state without administering anesthetic and other drugs, allowing the experiment operator to accurately note the physiological changes in the experiment animal during that period of time. This continuous monitoring improves on the flaws in detecting animal condition associated with the traditional interval time point assay.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

First Embodiment

The animal restraining apparatus and animal experiment for using the same are mainly applicable to hemodynamic, pharmacology, or physiology related research, so that the experiment can be monitored with the experiment animal in a conscious state without interference. The animal experiment comprises the following steps.

First, a plurality of live animals, such as mice, Wistar Kyoto (WKY) rat, guinea pig, or Sprague Dawley (SD) rat are selected as experiment subjects (known in short below as experiment animal 1). Depending on the experimental design and needs, the animal species is not limited to any particular choice. However, for a clear illustration of the present embodiment, the following description is made with a 6-week-old male SD rat as an example.

Figure 1:
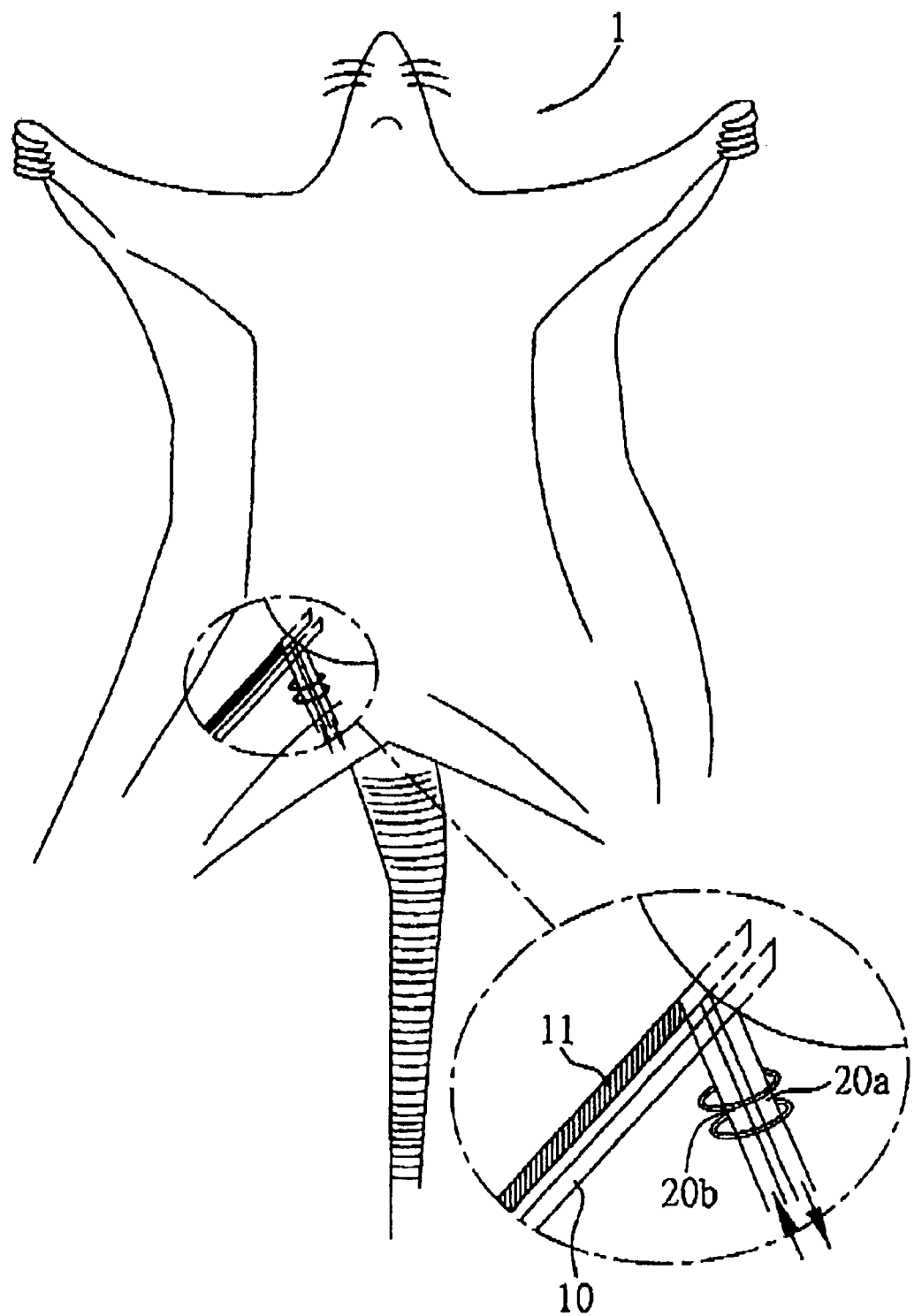
FIG. 1 is a schematic diagram illustrating a catheterization of the live animal in the animal experiment of the present invention.

As shown in FIG. 1, one of the pre-fed SD rats is selected and tied on an operation surface (not shown). The rat is put into a temporary unconscious state before cannulating a femoral artery 10 and/or a femoral vein 11 of the rat 1, such that a plurality of catheters 20a, 20b have one end inserted in the femoral artery and vein 10, 11 to serve as a drug entry channel (shown by an input arrow in the diagram) or a blood infusion channel (shown by an output arrow in the diagram), and the catheters 20a, 20b have the other end temporarily shut off after extending out of the body surface. Once the rat is situated in the restraining apparatus of the invention, the exposing end of the catheters 20a, 20b is then coupled to a three-way adaptor (not shown) and connected to an external surveillance/monitoring device, such as a pressure transducer shown as numeral 3 in FIG. 2, able to move horizontally and vertically and which is coupled to the animal heart to monitor the HR. Since the cannulation and catheter connecting steps described above are well known to one skilled in the pertinent art, the details are omitted herein.

Figure 2:
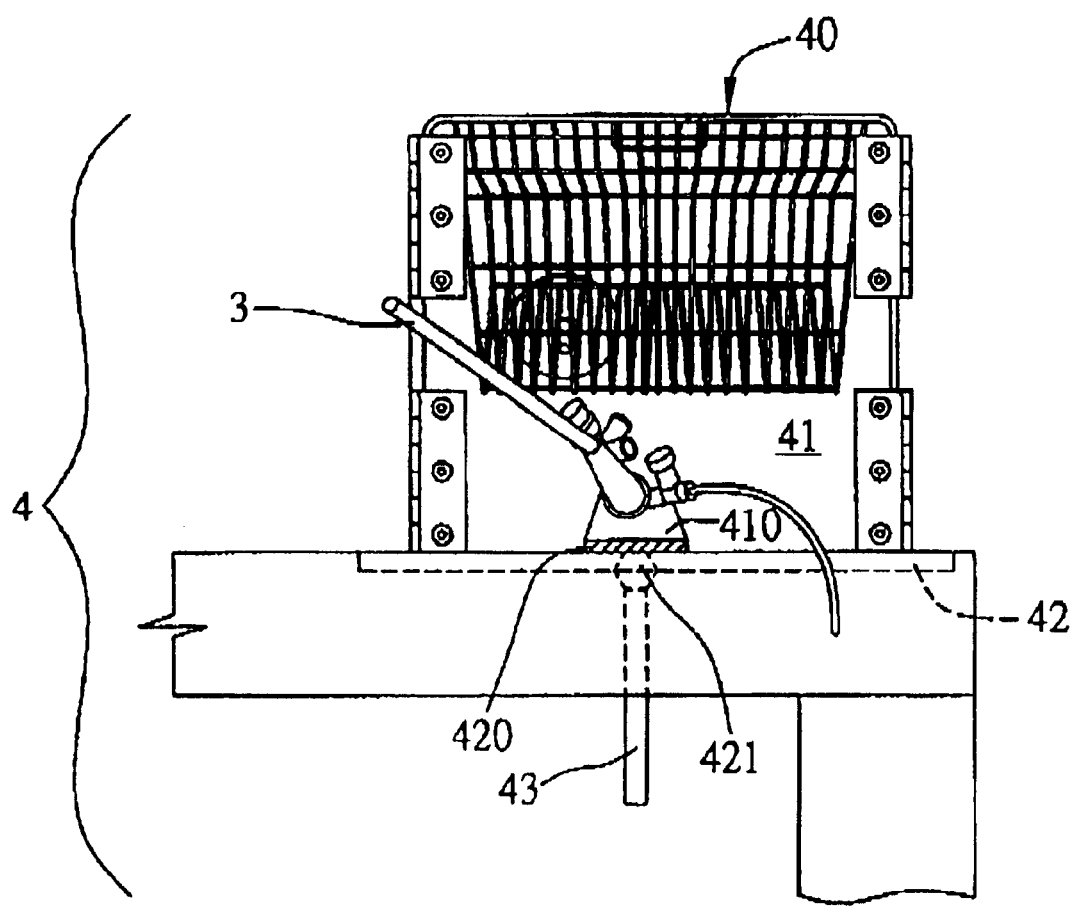
FIG. 2 is a three dimensional view illustrating an animal restraining apparatus according to the first embodiment of the present invention.

Next, the experiment animal 1 which is in a temporarily unconscious state is placed in the restraining apparatus 4 of the present invention. As illustrated in FIG. 2, the restraining apparatus 4 adopts a vertical design in the present embodiment. The restraining apparatus 4 comprises of a food supply apparatus 40 for providing the animal with food and water ad libitum, a plurality of partitioning boards 41 for confining the animal in the isolation space, a supporting board 42 for carrying the experiment animal 1 and the partitioning boards 41, and a fixing component 43 fitted outside the supporting board 42. An opening 410 is formed in the partitioning board 41 near the fixing component 43, with a guiding component 420 formed outside the opening on the supporting board 42, and at least one hole 421 is formed outside the guiding component 420 on the supporting board 42, such that the rat tail can pass through the opening 410 on the partitioning board 41, the guiding component 420, and the hole 421 on the supporting board 42, and occupy the same space with the fixing component 43 after the experiment animal is restrained in the restraining apparatus 4.

Figure 3:
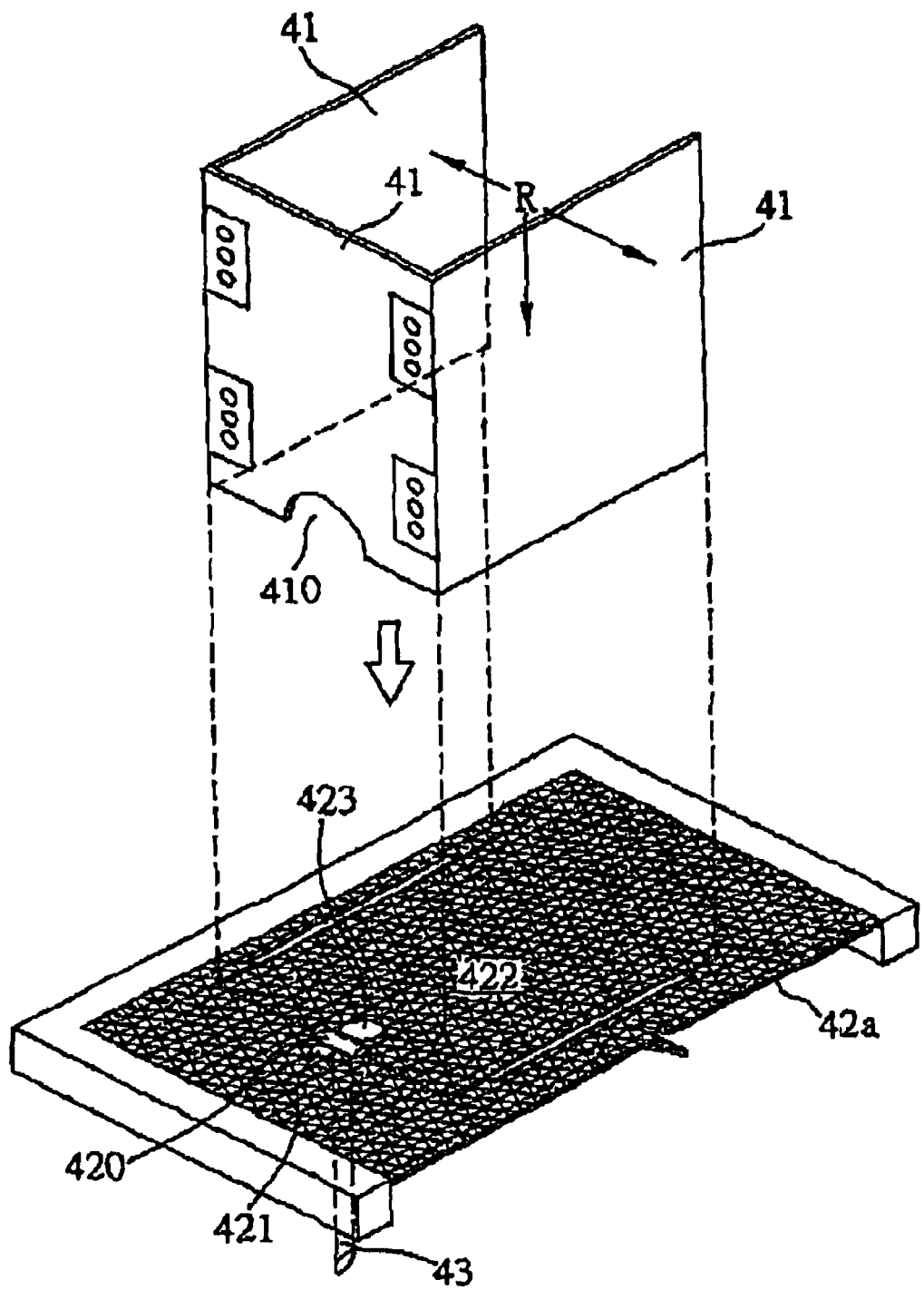
FIG. 3 is an exploded view illustrating the animal restraining apparatus according to the first embodiment of the present invention.

In the present embodiment, the restraining apparatus 4 as shown in FIG. 3 is an assembled metabolic cage that is enclosed by metal mesh, acrylic board, or glass board into an isolation compartment R in which the animal can move. However, the isolation compartment R shall not be limited to a closed space. As long as tail fixation is not affected, the isolation compartment can also be an open space.

Figure 4:
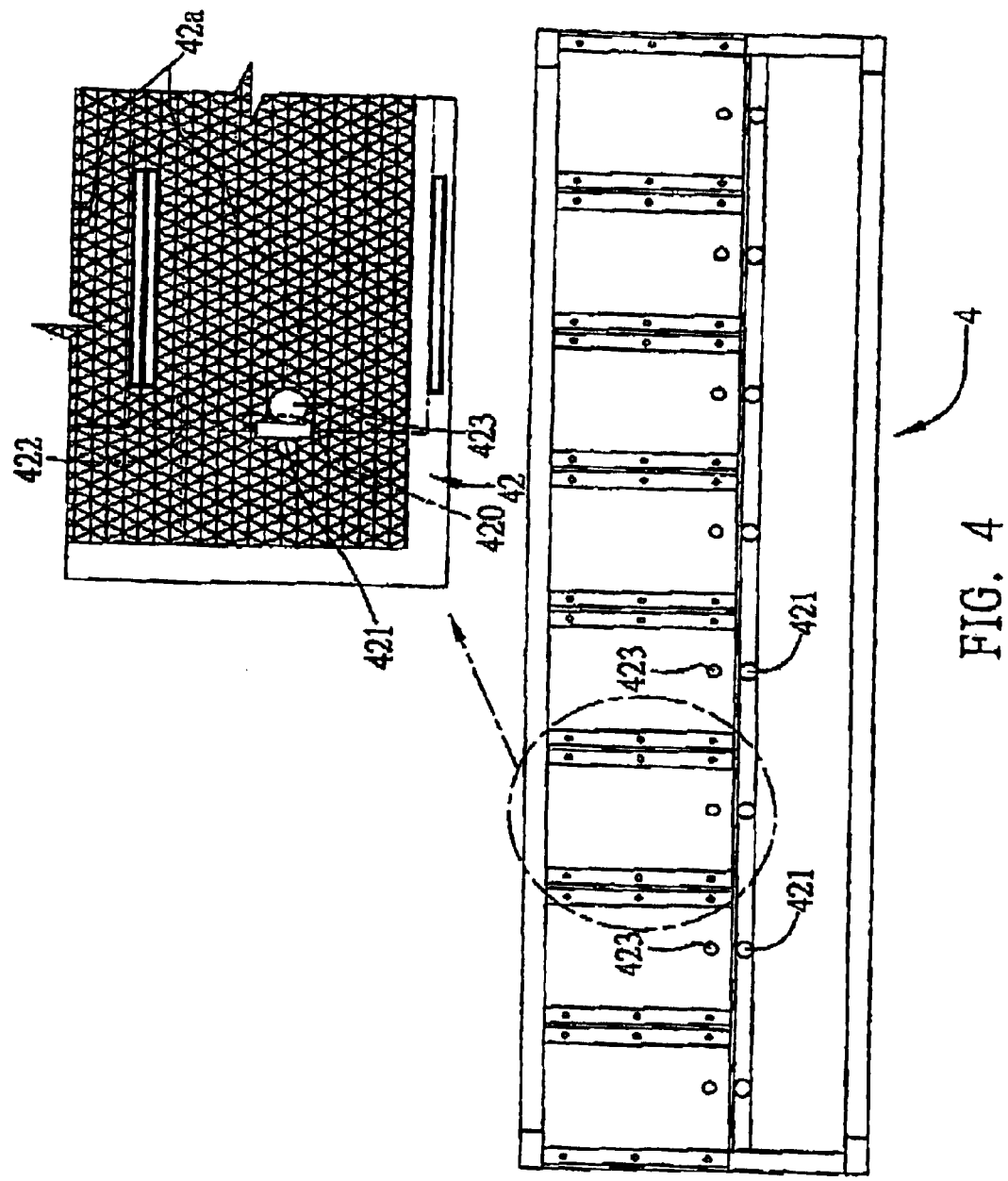
FIG. 4 is an elevated and enlarged view illustrating the animal restraining apparatus according to the first embodiment of the present invention.

Also, as both shown in FIG. 3 and FIG. 4, the supporting board 42 may be a wire mesh floor structure 42a. A plurality of sliding areas 422 for mounting the partitioning boards 41 are pre-defined on the wire mesh floor 42a, wherein at least one metal ring 420 with a predetermined curvature is formed on each sliding area 422 near the fixing component 43. With the metal ring 420 serving as the guiding component 420 of the restraining apparatus, the tail of the rat is provided with a support that best matches the natural curvatures of its tail, such that the tail can pass through the hole 421 on the supporting board 42 by curving along the curvature of the guiding component 420 and drop on either side of the fixing component 43 after it extends out from the opening 410 on the partitioning board 41. And, if it is required in the experimental design to collect droppings of the experiment animal, a waste hole 423 may be formed additionally in the sliding area 422 near the metal ring 420 on the wire mesh floor 42a, so that the rat dropping may fall via the waste hole 423 into a collection box below (not shown).

Figure 5:
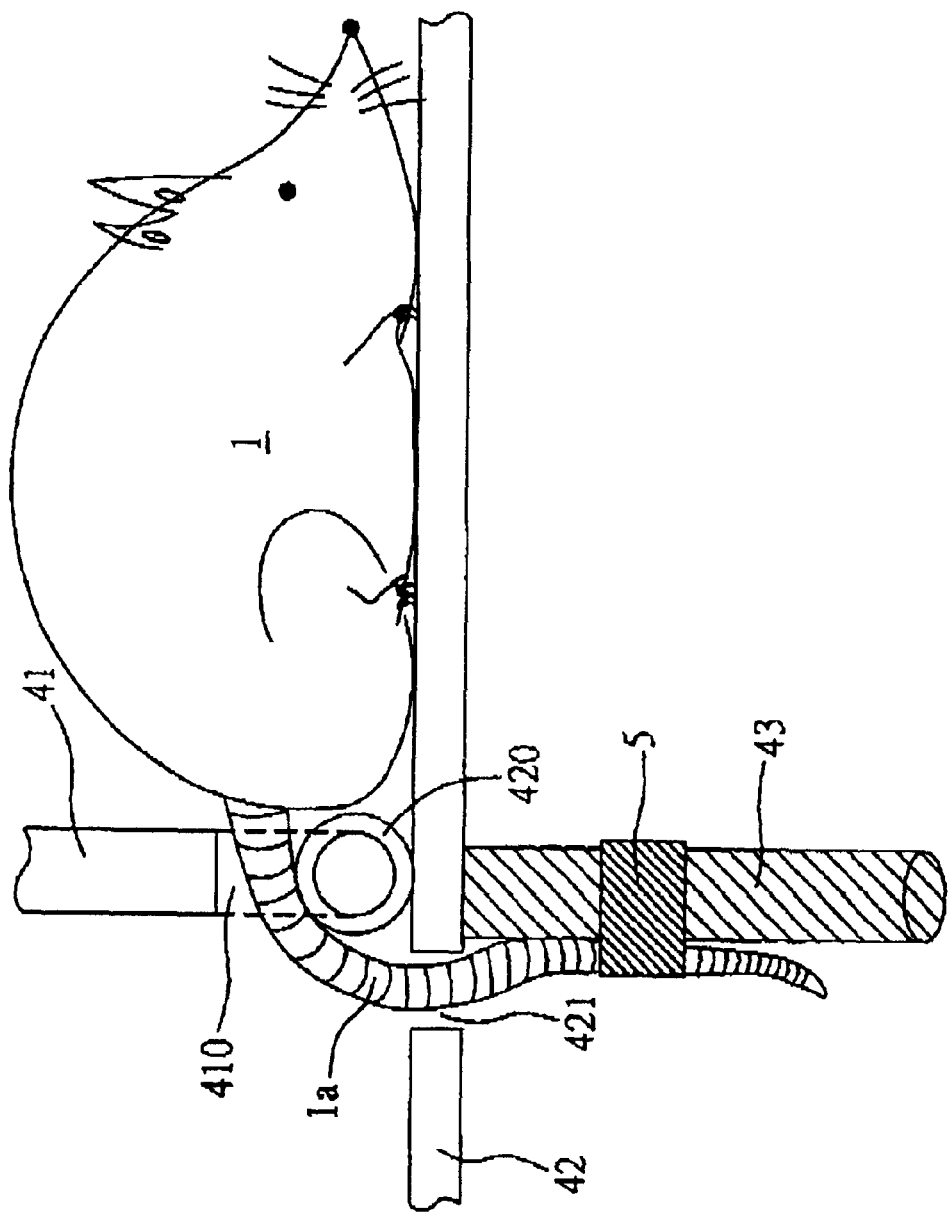
FIG. 5 is a schematic diagram illustrating the tail of the experiment animal fixed below the partitioning board in the animal experiment that uses the animal restraining apparatus of the present invention.
Figure 6:
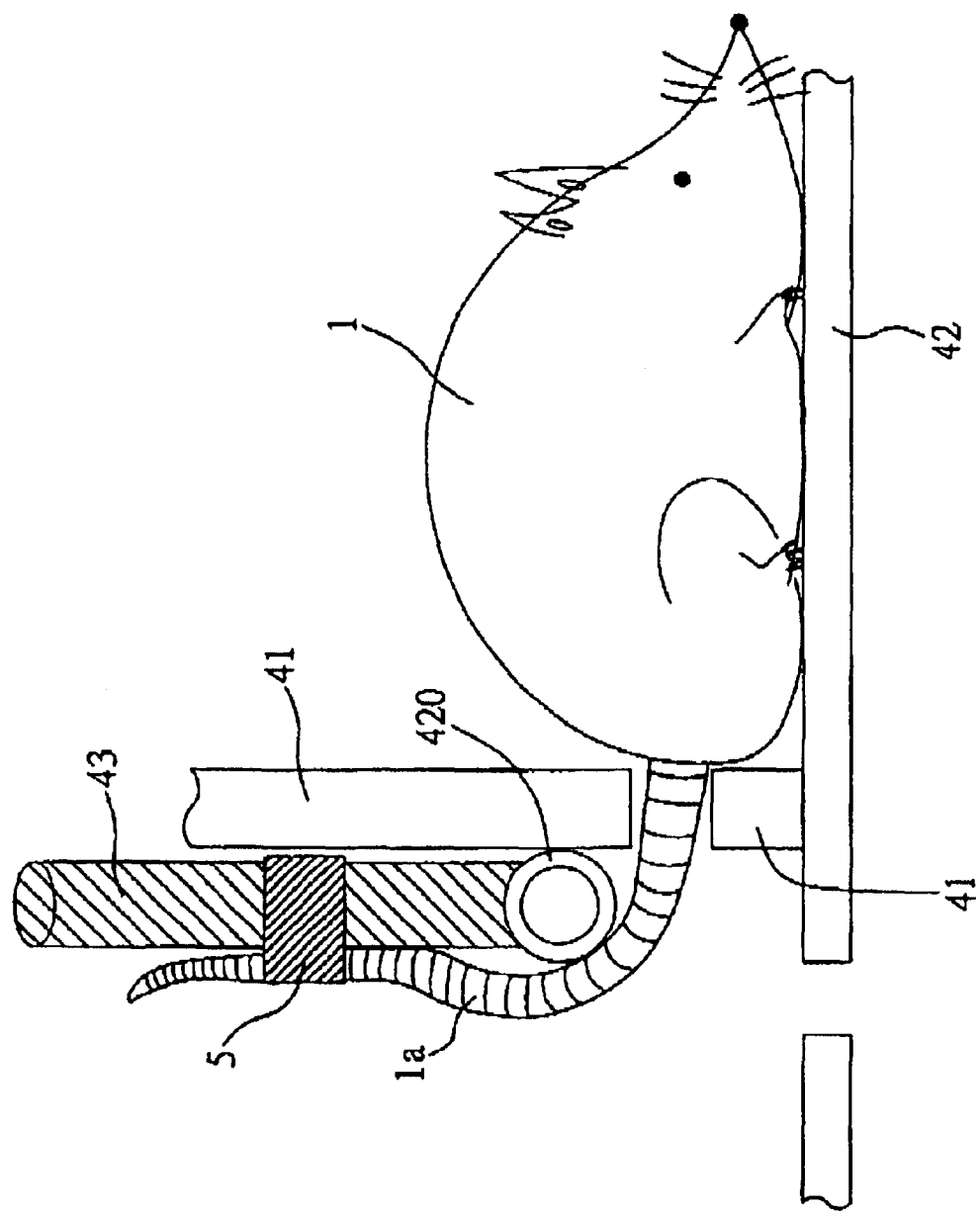
FIG. 6 is a schematic diagram illustrating the tail of the experiment animal fixed above the partitioning board in the animal experiment that uses the animal restraining apparatus of the present invention.

Next, as illustrated in both FIG. 5 and FIG. 6, the tail 1a of the rat 1 is fixed on the fixing component 43 by binding methods, such as binding with an adhesive tape 5. By stabilizing the position of the tail 1a, the lower portion of the rat 1 is immobilized to prevent accidental slippage of femoral artery and femoral vein catheters caused by pulling when the rat body moves. On the other hand, to make the tail fixing operation more convenient, the fixing component 43 and metal ring 420 for restraining the tail 1a are mounted directly on the outer face of the partitioning board 41 as shown in FIG. 6, so that the tail 1a can be hung up in an ideal physiological condition and bound to the fixing component without causing any pain or discomfort to the rat 1 during the tail fixing operation.

In addition to binding the tail to the fixing component with the adhesive tape, a heavy object (such as lead piece) may be hung from the tail of the rat in another embodiment of the present invention. So, with the heavy object, the tail is pulled by gravity to immobilize the lower portion of the animal body. This prevents the catheter from breaking loose from the animal with excessive movement during the experimental procedure.

According to the restraining apparatus adopted in the present invention, the tail of the rat is fixed below or above the cage by following the most natural physiological posture of the rat, and the lower portion of the animal body is immobilized by fixing the tail. Since the tail is fixed by binding with the adhesive tape or hanging with the heavy object, no pain or discomfort is done to the rat. This avoids excessive struggling of the animal and reduces rejecting or resisting behavior associated with learning ability. The experiment animal in the conscious state is kept emotionally stable during the experiment, so as to minimize the possibility of the in vivo physiological test value changing as a result of increased emotional stress. On the other hand, sampling and drug administration during the experiment can be directed to the rat body via the catheters. Therefore, conducting artificial operations, such as drug administration and blood sampling does not cause disturbance to the experiment animal, minimizing the level of interference caused by the artificial factors.

As the restraining apparatus can be operated easily and has very low equipment costs, the number of the experiment sets can be expanded without limit as long as space permits. Thus, many sets of the animals can be experimented on under the same control conditions to provide a larger sample number. And the drug inconsistency problem caused by administering the drug to the animals one by one is eliminated.

Furthermore, in comparison to traditional conscious state animal experiments, the animal experimental procedure of the invention can be combined with animal breeding. Moreover, the invention allows continuous monitoring for more than 72 hours in the conscious state, allowing the experiment operator to accurately note the physiological change in the animal body during that period of time. This continuous monitoring improves on the flaws in detecting animal condition associated with the traditional interval time point assay.

Second Embodiment

Figure 7:
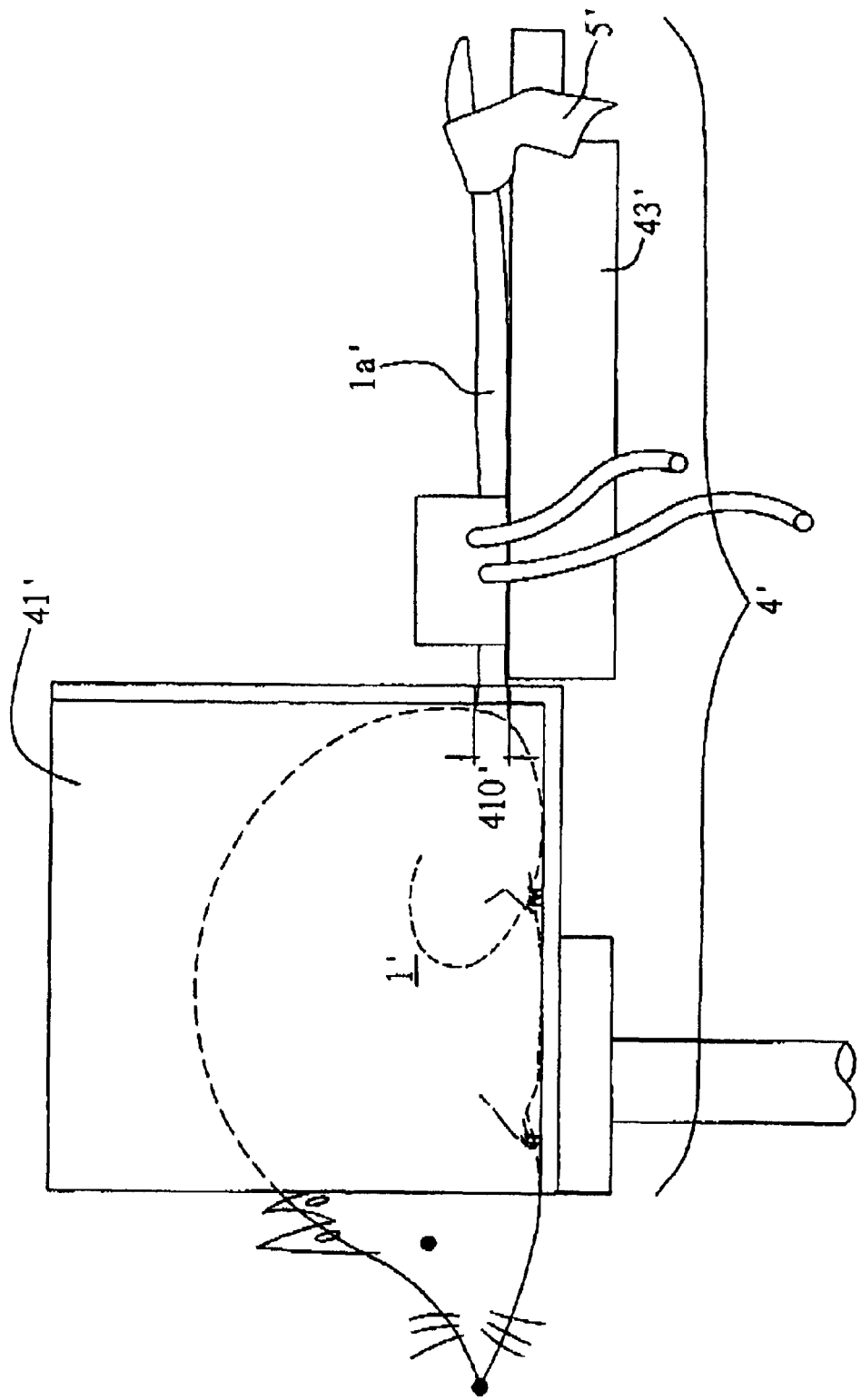
FIG. 7 is a three dimensional view illustrating an animal restraining apparatus according to the second embodiment of the present invention.

FIG. 7 is a three-dimensional diagram illustrating the animal restraining apparatus according to the second embodiment of the present invention. As shown in the diagram, most of the restraining apparatus 4' is structurally similar to that described in the first embodiment, except that the restraining apparatus has a linear design for easy measurement of the tail cuff pressure. And, instead of fitting the guiding component, a fixing board 43' is formed to extend horizontally from the back of the partitioning board 41', with the fixing board 43' having a length similar to that of the rat's s tail, so that when the tail 1a' extends out from the opening 410' of the partitioning board 41', the tail 1a' can lay prone on the fixing board 43' and be bound with the adhesive tape 5'. The restraining apparatus is designed horizontally, with the tail 1a' lying prone behind the opening 410' of the partitioning board 41'. The tail is bound with the adhesive tape 5' to immobilize the lower body of the animal. So, by comparison to the previously described embodiment, the present embodiment can be carried out in association with the photoelectric volume oscillometric method and other conventional methods to obtain data for hemodynamic experiments. On the other hand, either laying the tail prone or curving along the curvature of the guiding component as described above satisfies the most natural body posture of the rat. Thus, when the tail is bound with the adhesive tape, no pain or discomfort is experienced by the rat. This effectively reduces resistance and emotional stress by the rat, making the experimental results more accurate.

COMPARATIVE EXAMPLE

Figure 8:
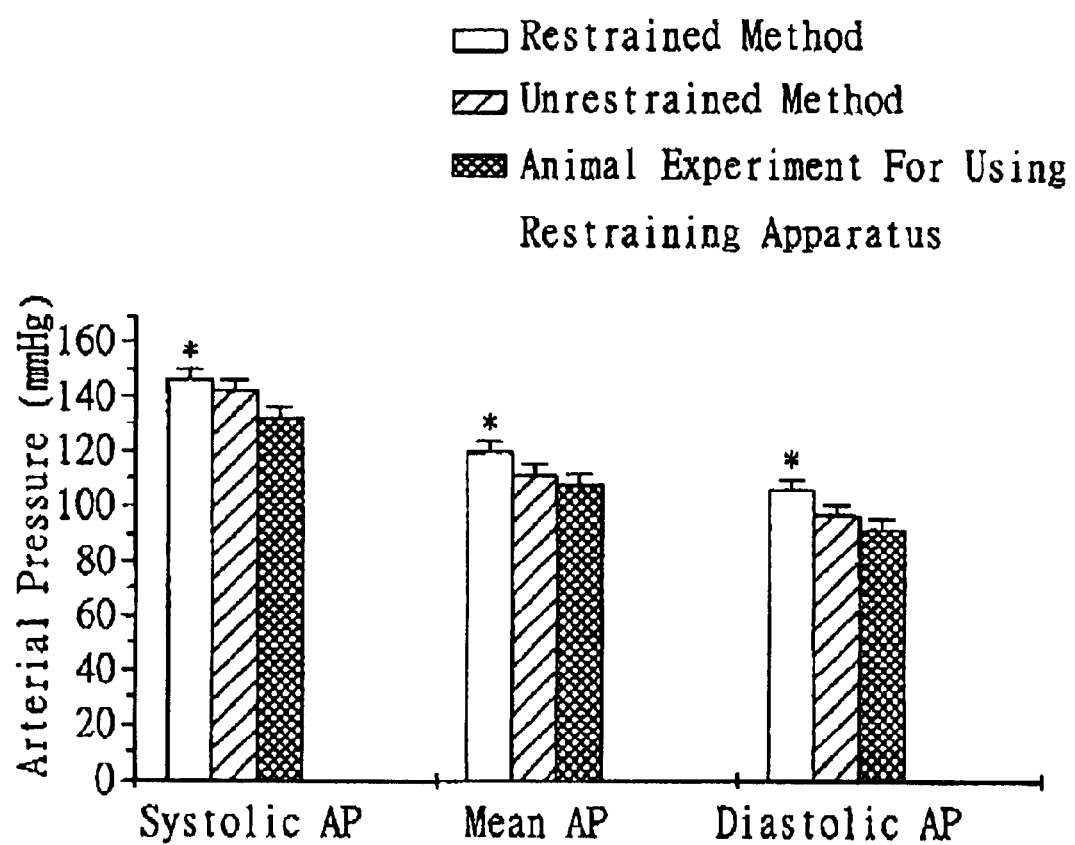
FIG. 8 is a diagram for comparing the arterial pressure using tail cuff pressure measurement conducted by the photoelectric volume oscillometric method with either the restraining apparatus of the present invention, the conventional closed restraining box, or the conventional open restraining box.
Figure 9:
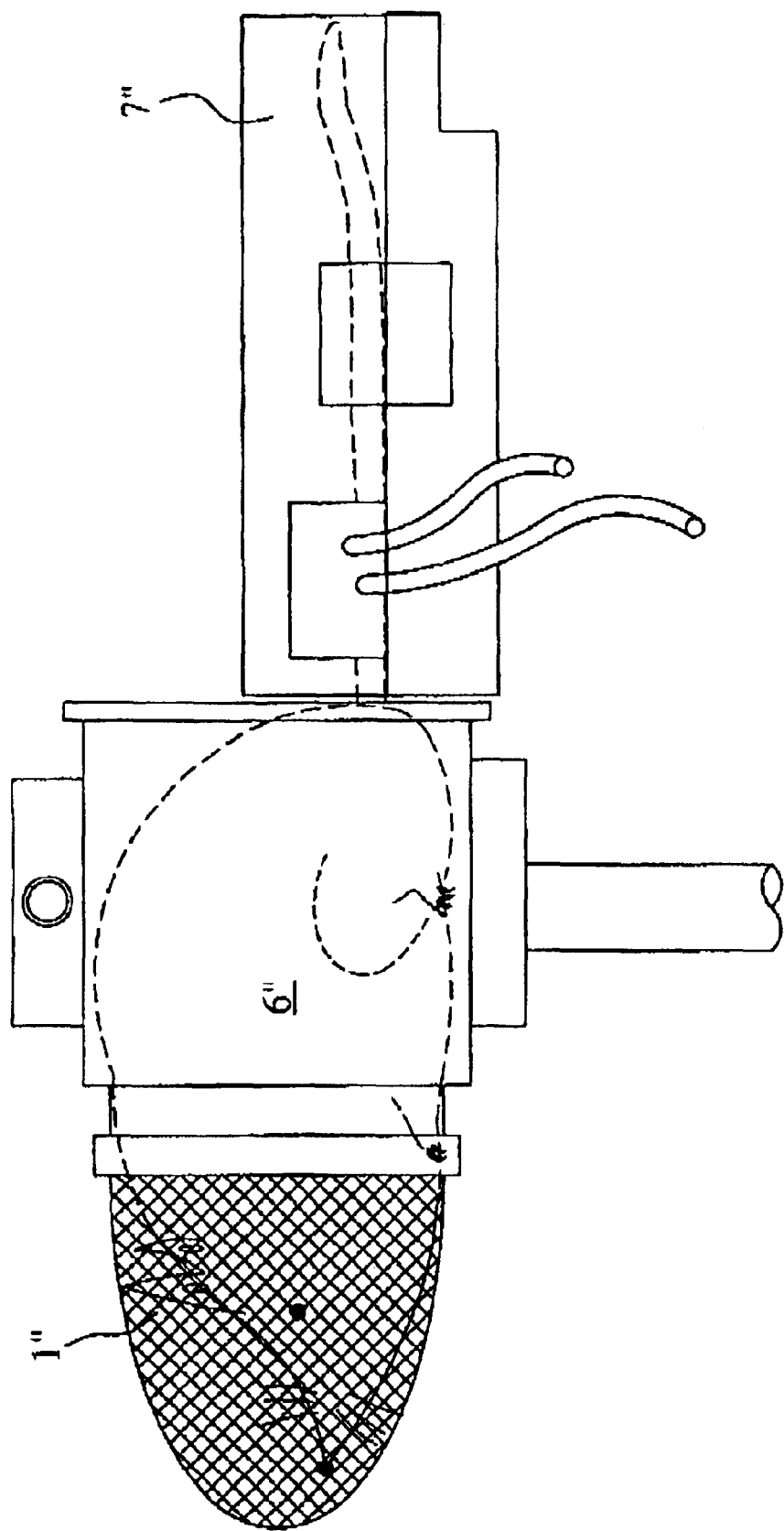
FIG. 9 is a superficial view illustrating hemodynamic measurement conducted with the experiment animal placed in the conventional restraining apparatus.

FIG. 8 illustrates measurement of the tail cuff pressure with the photoelectric volume oscillometric method commonly adopted in hemodynamic research as an example, so as to compare tail cuff pressure of the conscious rat conducted in the restraining apparatus of the invention, the traditional closed restraining box, and the traditional open restraining box, in order to assess the effect of the restraining apparatus on the emotional state of the experiment animal. As shown in FIG. 8, it can be seen from the comparison of tail cuff pressure with three experimental parameters—systolic arterial pressure, mean arterial pressure, and diastolic arterial pressure—that the arterial pressure measured has the least increase when the restraining apparatus is used. And from the results previously published in a journal, it has been proven that arterial pressure of the animal gets higher when the experiment animal experiences higher emotional stress. The result in FIG. 8 clearly illustrates that the rat experiences the least emotional stress in the experimental environment established by the apparatus of the present invention. In other words, the effects of the experimental method on the emotion of the animal can be significantly reduced when the restraining apparatus of the invention is applied to the animal experiments. So, the result of the monitoring instrument more truly reflects the physiological effects induced by the experimental factors.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all modifications, such as modifying the types of the partitioning boards, fitting the movable door, changing animal species, and similar arrangements.

What is claimed is:

1. An animal restraining apparatus applicable to physiological, pharmacological, and hemodynamic research, the animal restraining apparatus comprising:
   a plurality of partitioning boards to partition a restraining space for placing at least one experiment animal;
   a supporting board for carrying the experiment animal and the partitioning boards;
   a fixing component formed outside the restraining space, wherein an opening is formed near the fixing component in the partitioning board and a guiding component having a pre-defined curvature is formed outside the opening, so that the tail of the experiment animal extends out from the opening and conforms to the curvature of the guiding component to occupy the same space with the fixing component; and a binding component for fixing the tail of the animal on the fixing component, so that the lower body of the experiment animal is immobilized by fixing the tail.

2. The animal restraining apparatus of claim 1, wherein the fixing component is formed below the supporting board and the guiding component is formed on the supporting board.

3. The animal restraining apparatus of claim 1, wherein the guiding component is a metal ring and the metal ring has a curvature that conforms to in the natural tail curvature of the experiment animal.

4. The animal restraining apparatus of claim 1, further comprising a hole formed in the supporting board outside the opening for the tail to pass through.

5. The animal restraining apparatus of claim 1, wherein the experiment animal is a live experiment animal in a conscious state.

6. The animal restraining apparatus of claim 1, wherein the fixing component is formed below the supporting board.

7. The animal restraining apparatus of claim 1, wherein the fixing component is formed above the opening.

8. The animal restraining apparatus of claim 1, wherein the fixing component is formed behind the opening.

9. The animal restraining apparatus of claim 8, wherein the fixing component has an extended length to the length of the experiment animal's tail.

10. The animal restraining apparatus of claim 1, wherein the binding component is an adhesive tape.

11. The animal restraining apparatus of claim 1, wherein the fixing component and the guiding component are mounted directly on the partitioning board, such that the tail of the experiment animal is hung up in a physiological position.

* * * * *